United States Patent
Collet et al.

(10) Patent No.: US 8,467,815 B2
(45) Date of Patent: Jun. 18, 2013

(54) MOBILE ADDRESS BOOK POPULATION USING SMS POLLING

(75) Inventors: Jean-Luc Collet, La Gaude (FR); Gerard Marmigere, Drap (FR); Eric Menguy, Roquefort les Pins (FR); Carole Truntschka, Saint-Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 12/483,013

(22) Filed: Jun. 11, 2009

(65) Prior Publication Data

US 2010/0261463 A1 Oct. 14, 2010

(30) Foreign Application Priority Data

Apr. 9, 2009 (EP) .................................... 09305305

(51) Int. Cl.
*H04W 4/00* (2009.01)
*H04W 3/42* (2006.01)

(52) U.S. Cl.
USPC ...................................... 455/466; 455/414.1

(58) Field of Classification Search
USPC ....................................................... 455/466
See application file for complete search history.

(56) References Cited

U.S. PATENT DOCUMENTS

| 6,377,161 | B1 | 4/2002 | Gromelski et al. | |
| 6,553,222 | B1 | 4/2003 | Weiss | |
| 2004/0066920 | A1* | 4/2004 | Vandermeijden | 379/88.19 |
| 2004/0198329 | A1* | 10/2004 | Vasa | 455/414.1 |
| 2005/0198180 | A1 | 9/2005 | Khanolkar et al. | |
| 2007/0032252 | A1* | 2/2007 | Yang | 455/466 |
| 2007/0155409 | A1* | 7/2007 | Goyal et al. | 455/466 |
| 2008/0242322 | A1* | 10/2008 | Scott et al. | 455/466 |
| 2009/0042590 | A1* | 2/2009 | Celik et al. | 455/466 |

FOREIGN PATENT DOCUMENTS

| EP | 1826998 A1 | 8/2007 |
| WO | 2004030326 A3 | 4/2004 |

\* cited by examiner

*Primary Examiner* — Dwayne Bost
*Assistant Examiner* — Christopher Kohlman
(74) *Attorney, Agent, or Firm* — Hoffman Warnick LLC; Douglas A. Lashmit (57) ABSTRACT

A system, method and program product that automatically populates address book fields. A system is described that includes: a system for sending and receiving SMS messages; an address book that includes an entry for an owner and entries for contacts associated with the owner, wherein each entry includes a set attributes and at least one piece of attribute data; a system for parsing an incoming SMS message to identify a request for attribute data of the owner and for generating a responsive SMS message with attribute data of the owner; and a system for issuing SMS messages to contacts in the address book requesting additional attribute data and for loading received attribute data into the address book.

22 Claims, 5 Drawing Sheets

MOBILE ADDRESS BOOK POPULATION USING SMS POLLING

FIELD OF THE INVENTION

This disclosure is related to populating data in address books on mobile devices, and more particularly to a system and method of populating missing data in address books on mobile devices using SMS polling.

BACKGROUND OF THE INVENTION

Almost every mobile communication device (e.g., cell phone, PDA, etc.) provides an address book whose entries include several attributes for storing contact information, e.g., name, mobile number, home number, address, date of birth, picture, etc. In most cases however, only some subset of these attributes are utilized, such as a name and phone number. Populating other attributes is a time consuming and error prone manual process.

Currently, standards exist for storing such contact information. One such standard, commonly referred to as vCard, is described, e.g., at http://www.w3.org/TR/2001/NOTE-vcard-rdf-20010222. Described therein is a Resource Description Framework (RDF) for encoding a vCard profile defined by RFC 2426 and to provide equivalent functionality to its standard format. This note describes a structure to enable the common and consistent description of persons (using the existing semantics of vCard) and to encode these in RDF/XML.

Various approaches to implementing an automated process have been considered, but such solutions involve synchronization in a push mode. For instance, EP Patent application EP 1 826 998 A1, "Method to accomplish download of contacts into a phonebook of a telephone," published on Aug. 29, 2007, which is hereby incorporated by reference, describes a first device pushing data to a set of frequently called second devices. This solution however fails to directly solve the problem of obtaining address information at a user's own device.

Accordingly, a need exists for a system and method that can better automated mobile address population.

SUMMARY OF THE INVENTION

The present invention provides a system, method and program product to expose and retrieve mobile missing address book attributes through short message service (SMS) requests in an asynchronous and transparent way for the owner.

In one embodiment, there is a mobile communication device that automatically populates address book fields, comprising: a system for sending and receiving SMS messages; an address book that includes an entry for an owner and entries for contacts associated with the owner, wherein each entry includes a set attributes and at least one piece of attribute data; a system for parsing an incoming SMS message to identify a request for attribute data of the owner and for generating a responsive SMS message with attribute data of the owner; and a system for issuing SMS messages to contacts in the address book requesting additional attribute data and for loading received attribute data into the address book.

In a second embodiment, there is a computer readable medium having a computer program product stored thereon, which when executed by a computing device, automatically populates address book fields on a mobile device, comprising: program code for sending and receiving SMS messages; program code for accessing an address book that includes an entry for an owner and entries for contacts associated with the owner, wherein each entry includes a set attributes and at least one piece of attribute data; program code for parsing an incoming SMS message to identify a request for attribute data of the owner and for generating a responsive SMS message with attribute data of the owner; and program code for issuing SMS messages to contacts in the address book requesting additional attribute data and for loading received attribute data into the address book.

In a third embodiment, there is a method for automatically populating address book fields on a mobile device, comprising: providing access to an infrastructure for sending and receiving SMS messages; providing access to an address book that includes an entry for an owner and entries for contacts associated with the owner, wherein each entry includes a set attributes and at least one piece of attribute data; issuing SMS messages to contacts in the address book requesting additional attribute data; and loading received attribute data into the address book.

In a fourth embodiment, there is a method for deploying a system for automatically populating address book fields on a mobile device, comprising: providing a computer infrastructure being operable to: send and receive SMS messages; access an address book that includes an entry for an owner and entries for contacts associated with the owner, wherein each entry includes a set attributes and at least one piece of attribute data; parse an incoming SMS message to identify a request for attribute data of the owner and for generating a responsive SMS message with attribute data of the owner; and issue SMS messages to contacts in the address book requesting additional attribute data and for loading received attribute data into the address book.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
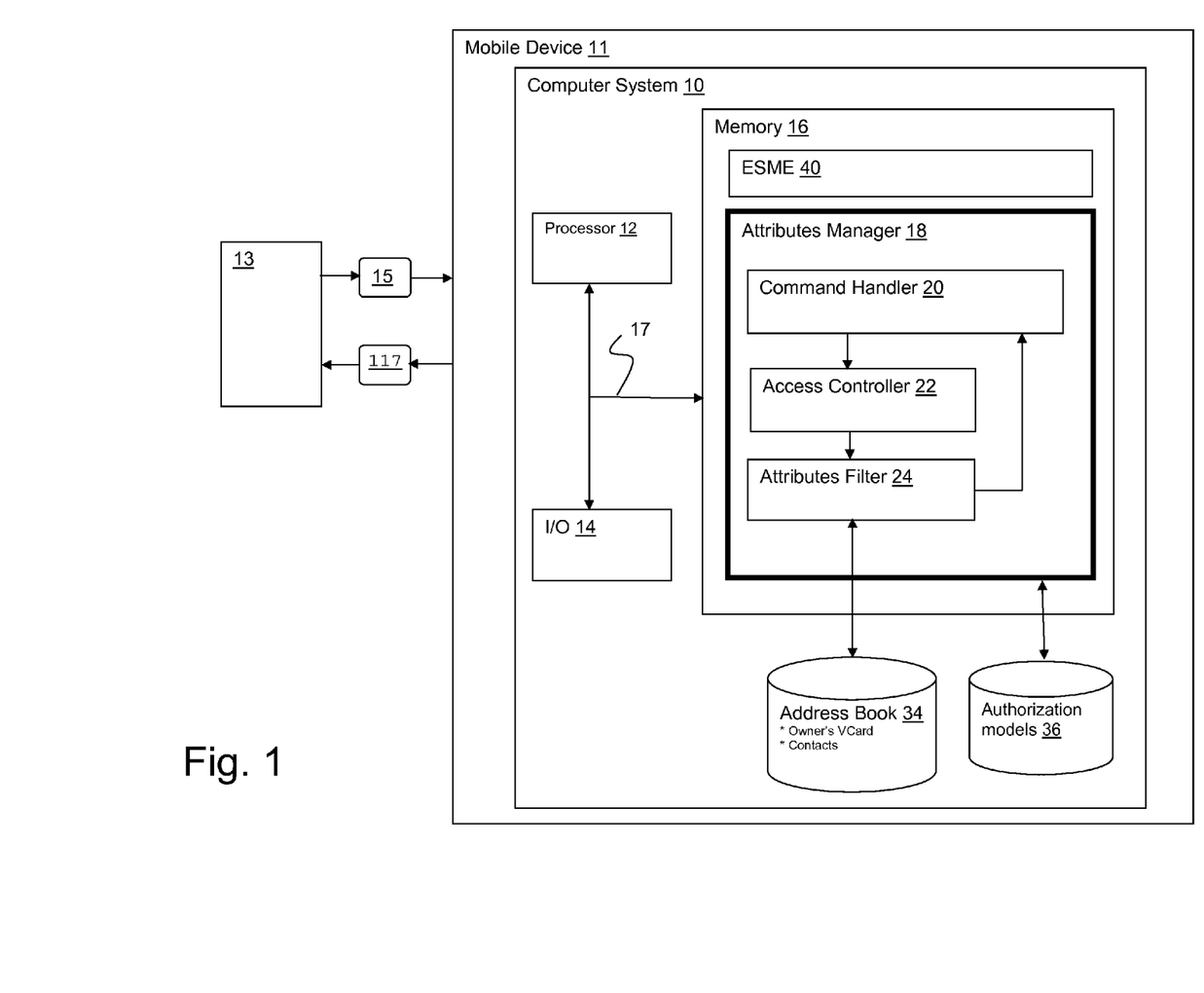
FIG. 1 depicts a computer system having an attributes manager in accordance with an embodiment of the present invention.

FIG. 1 depicts an address book update infrastructure for allowing mobile devices 11, 13 to automatically update contact information in their address books. A mobile device 11 is shown having a computer system 10 that includes an attributes manager 18 for automatically populating an address book 34 associated with the mobile device 11. Entries in the address book 34 are made up of attributes that include, e.g., name, address, cell number, home number, work number, fax number, multimedia data, email, etc. Address book 34 holds: (1) an entry or a virtual card (vCard) containing attribute data of the device 11 owner; and (2) entries that contain attribute data for the owner's contacts. As is typical, not all of the attributes for an owner's contacts contain data, i.e., many contact entries may only include a name and phone number. Note that for the purposes of this disclosure, the term "owner" refers to the individual or entity that is associated with the address book.

Attributes manager 18 includes the capability to both: (1) send a request 117 for additional attribute data associated with an owner of another mobile device 13, i.e., act as a "requester" of contact information; and (2) receive a request 15 for attribute data associated with mobile device 11, act as a "provider" of contact information. Accordingly, although not shown, mobile device 13 (as well as any other device participating in this update infrastructure) includes an attributes manager 18 and address book 34 similar that shown in mobile device 11.

As described in further detail herein, the request for and provided attribute data is communicated using SMS (short message service) via an external short message entity (ESME) 40 and an external SMS center (not shown). SMS is a well understood technology, and is therefore not described in extensive detail. In general, an ESME 40 at a first device sends and receives SMS messages with an ESME at a second device via an external SMS center (SMSC) based on respective telephone numbers of the devices. ESME 40 may comprise any system, process, module, client, software routine, plugin, etc., for allowing SMS messages to be sent or received from a mobile device.

Attributes manager 18 generally includes a command handler 20, an access controller 22, and an attributes filter 24. Command handler 20 manages incoming and outgoing requests for attribute data. Command handler 20 is in charge of parsing incoming SMS messages in order to identify and analyze the request 15 and to respond with attributes of the owner. Command handler 20 is also responsible for issuing requests 117 and handling responsive attribute information, i.e., new attributes, for contacts in address book 34.

Access controller 22 filters requests 15 by comparing the requester's (mobile device 13) mobile number against a list of authorized numbers (a white list) or unauthorized numbers (a black list). If the request 15 is authorized, access controller 22 retrieves an authorization model 36 associated with the requester 13. The authorization model 36 dictates what attribute data can be sent to unique requesters or set of requesters. For instance, the authorization model 36 may describe the set of attributes supported by the requester. In another embodiment, the authorization model 36 may allow the provider to limit the information being sent to, e.g., protect privacy. For instance, it may dictate that certain requesters should not receive the owner's home address and phone number, but are okay to receive the business address and phone number. Authorization model 36 may be implemented in any fashion, e.g., as a list of devices and associated address book attributes, as a control list that is applied to individual contacts in an address book, etc.

Attributes filter 24 filters the attributes requested against the authorization model 36 and the attributes supported by requester's device 13. Attributes filter 24 retrieves the appropriate attributes from the owner's vCard in address book 34 and passes them to the command handler 20 for communication back to the requester 13.

As noted, attributes manager 18 is responsible for both sending an attributes request 117 and receiving an attributes request 15. An illustrative process for sending an attributes request from a requester to a provider is described in FIG. 2. At S1, an MSISDN (Mobile Station International Subscriber Directory Number), i.e., telephone number of the provider's mobile device, is first determined by the requester, e.g., from the address book. At S2, existing attribute values of the provider are retrieved from the address book based on the MSISDN. An address book attributes (ABA) request is then built by the command handler of the requester based on the non-filled attributes in the address book, at S3. For instance, the address book may have the name and cell phone number of a provider, but nothing else. The ABA request would include a request for all other attributes (business phone, fax, email, picture, etc.). At S4, the command handler forwards the ABA request to the provider using SMS via an SMSC. At some time thereafter, the requester receives a responsive SMS from the provider via the SMSC at S5. Next a check is made to see if the SMS includes an ABA response, and if so, the command handler is invoked to parse the ABA response at S6. At S7, the command handler stored the attribute values in the ABA response for the associated MSISDN in the address book.

Figure 2:
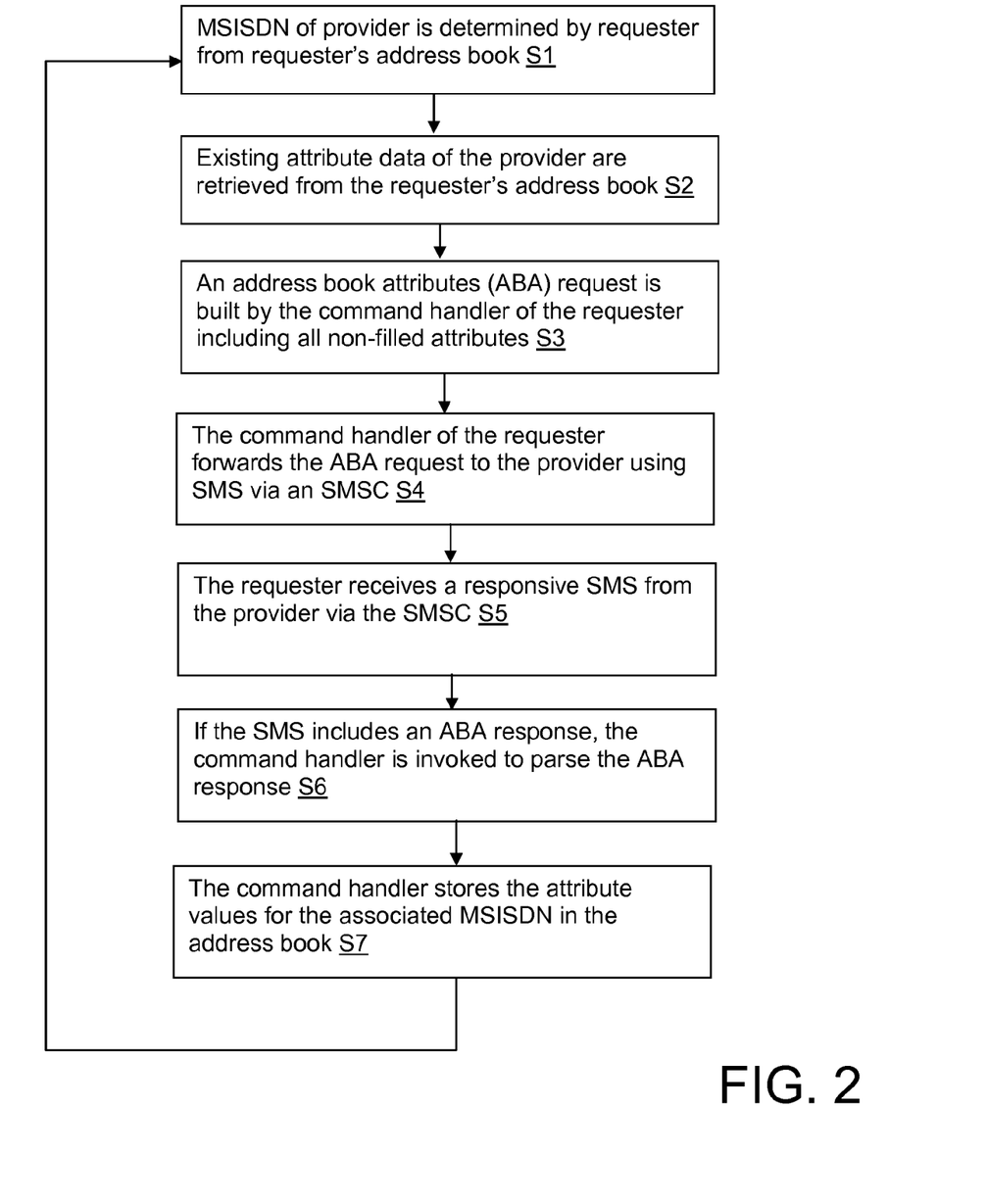
FIG. 2 depicts a flow diagram in accordance with an embodiment of the present invention.

In one embodiment, the process shown in FIG. 2 may be repeated for each entry in the requester's address book—e.g., in a polling fashion. The polling process may then be initiated again from time to time to ensure that the address book is up to date. In another embodiment, the process may be implemented anytime a new entry is added to the address book, or by some other on-demand process initiated by the owner.

Figure 3:
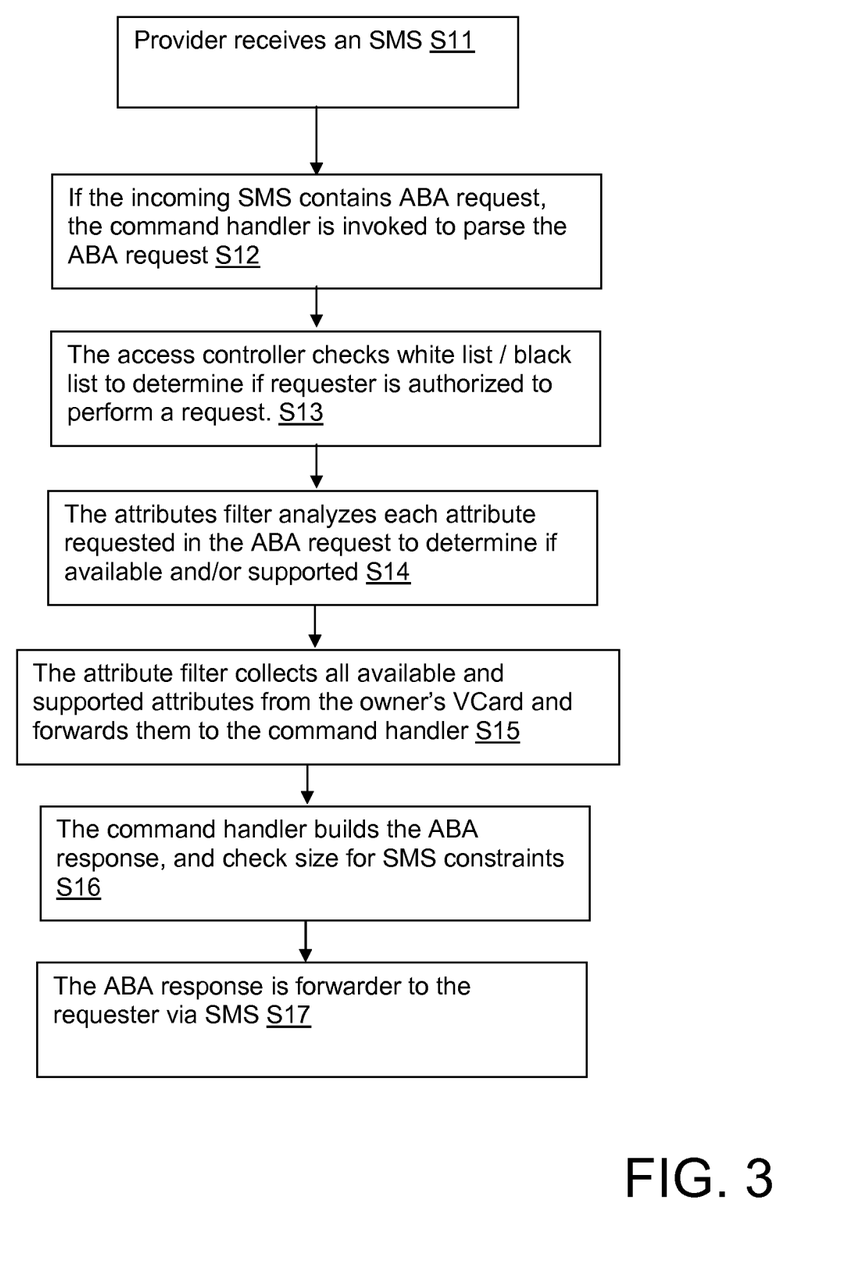
FIG. 3 depicts a flow diagram in accordance with an embodiment of the present invention.

FIG. 3 depicts an illustrative process for processing a received attributes request. At S11, a provider receives an SMS and at S12, if the SMS contains an ABA request, the command handler is invoked to parse the ABA request. At S13, after parsing, the access controller checks a white list and/or black list to determine if the requester is authorized to perform a request. If it is not authorized, the SMS message may be deleted. If yes, then at S14, the attributes filter analyzes each attribute requested in the ABA request to determine if it is available and/or supported, e.g., by checking an authorization model. Each attribute that is supported and available is forwarded to the command handler, which builds an ABA response at S16. Command handler also checks the size of the ABA response to ensure that it conforms with SMS constraints. For instance, SMS messages typically must be less than 160 bytes. If the message exceeds the size limitation, the message is broken into multiple messages that include chaining information and sequence numbers. At S17, the ABA response is forwarded to the requester via one or more SMS messages.

Figure 4:
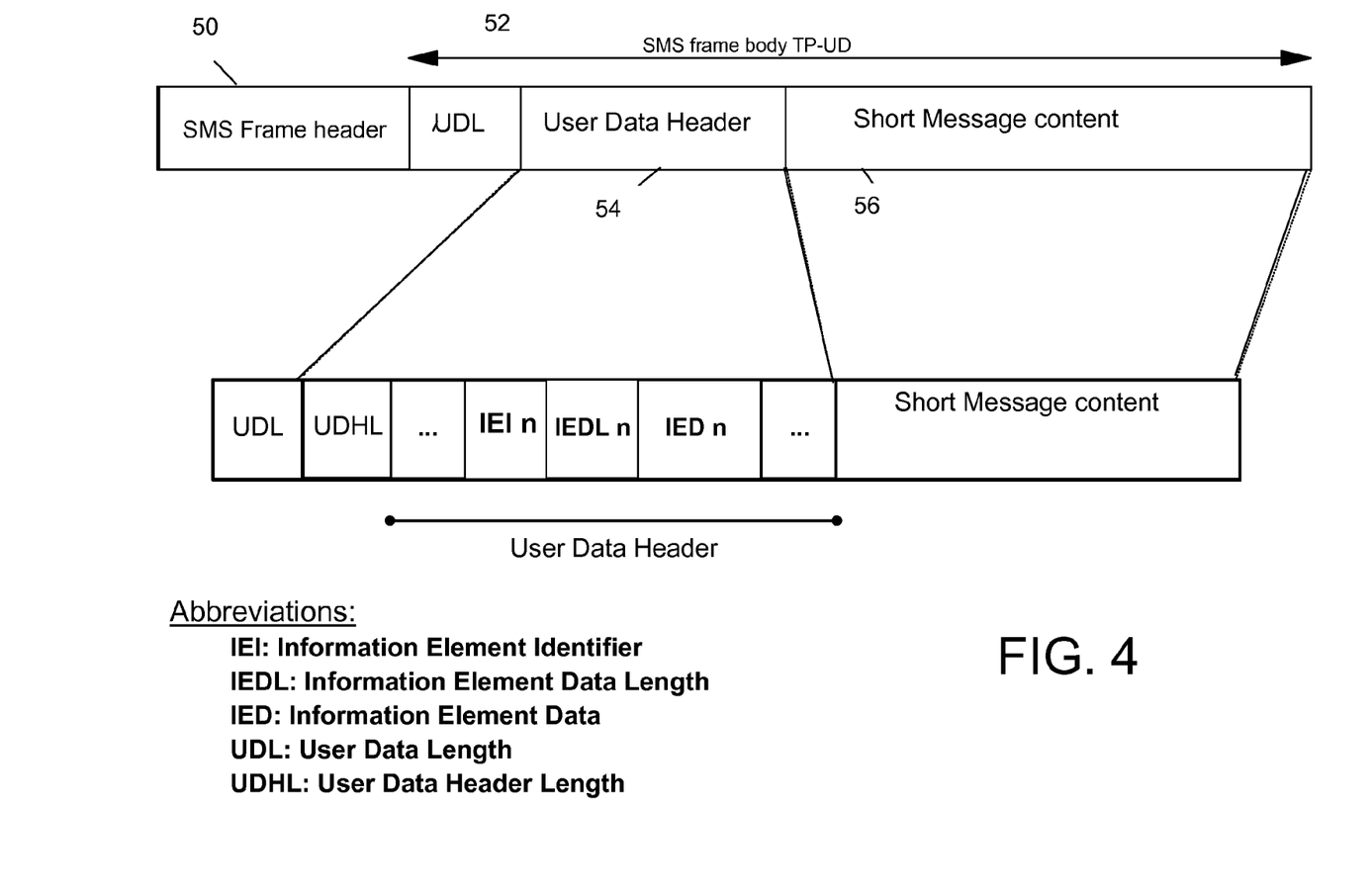
FIG. 4 depicts an SMS structure in accordance with an embodiment of the present invention.

FIG. 4 depicts an SMS structure, which includes an SMS frame header 50 and an SMS frame body. The frame body 52 includes a user data header field 54 and a short message content field 56. In one illustrative embodiment, user data header fields 54 are formatted as follows to get or set attributes:

| | |
|---|---|
| IEI0 Command where: | x"10" Get Attribute |
| | x"20" Set Attribute |
| IEDL0 set to "0" | |
| IED0 do not exist | |

-continued

| | |
|---|---|
| IEI1 Segmenting Where: | x"01" Last Segment |
| | x"02" First Segment |
| | x"03" Only Segment |
| | x"00" Middle Segment |
| IEDL1 set to "1" | |
| IED1 Segment number from "1" to "255" | |

For Get Attribute, the short message content field 56 is filled with formatted list of attributes names.

For Set Attribute, short message content field 56 is filled with formatted list of attributes names and the corresponding value.

The following is an illustrative RDF vCard that includes a photo element as inline binary content.

```
<?xml version="1.0"?>
  <rdf:RDF xmlns:rdf = "http://www.w3.org/1999/02/22-rdf-syntax-ns#"
      xmlns:vCard = "http://www.w3.org/2001/vcard-rdf/3.0#" >
    <rdf:Description rdf:about = "http://qqqfoo.com/staff/corky">
      <vCard:FN> Corky Crystal </vCard:FN>
      <vCard:N rdf:parseType="Resource">
        <vCard:Family> Crystal </vCard:Family>
        <vCard:Given> Corky </vCard:Given>
      </vCard:N>
      <vCard:EMAIL rdf:parseType="Resource">
        <rdf:value> corky@qqqfoo.com </rdf:value>
        <rdf:type rdf:resource="http://www.w3.org/2001/vcard-
rdf/3.0#internet"/>
      </vCard:EMAIL>
      <vCard:URL rdf:resource="http://qqqfoo.com/staff/corky-home.html"/>
      <vCard:PHOTO vCard:ENCODING="b" vCard:TYPE="image/jpeg">
MIICajCCAdOgAwIBAgICBEUwDQEEBQAwdzELMAkGA1UEBhMCVVMxLDA
      qBgNVBAoTI05ldHNjYXBlIENvbW11bmljYXRpb25z.....W992WW329
      </vCard:PHOTO>
    </rdf:Description>
  </rdf:RDF>
```

Figure 5:
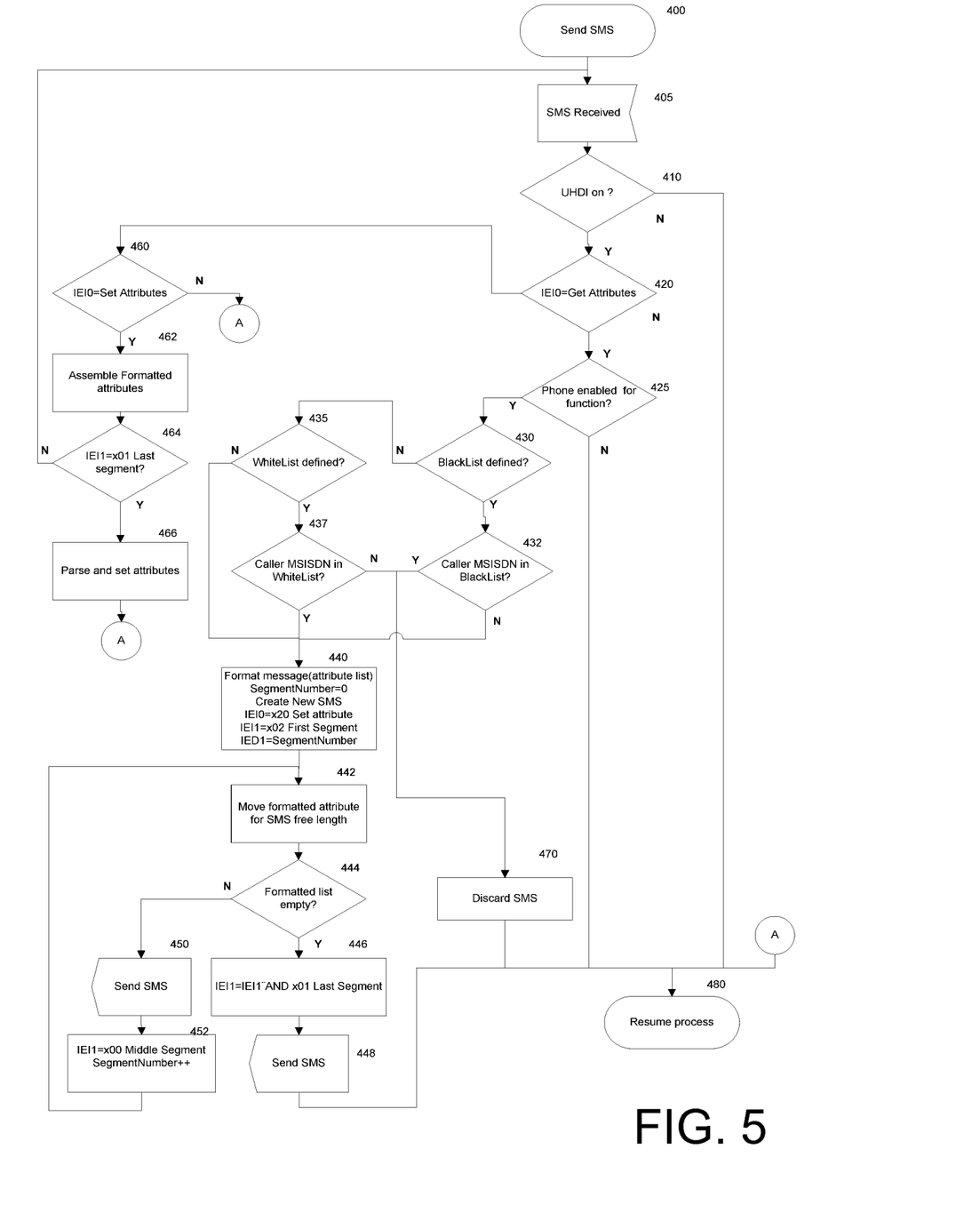
FIG. 5 depicts a flow diagram in accordance with an embodiment of the present invention.

FIG. 5 depicts a flow chart showing a more involved update process. At 400, and SMS is sent and at 405 and SMS is received. At 410, a check is made to see if the UHDI (User Data Header ????) is turned on. If so, at 420, a check is made to see if IEI0=Get Attributes. If no, then a check is made at 460 to see if IEI0=Set Attributes. If yes, formatted attributes are assembled at 462 and attributes are parsed and set at 466.

If IEI0=Get Attributes at 420, then a check is made to see if the phone is enabled at 425. If yes then a black list check process is made at 430 and 432, and a white list check process is made at 435 and 437. If either fails, then the SMS is discarded at 470.

At 440, a message is formatted and new SMS is created and at 442, the formatted attribute is moved for SMS free length (i.e., to handle the case where the message is longer than allowed). At 444, a check is made to see if the formatted list is empty, and if not the SMS is sent at 450, IEI1 is set to x00 Middle Segment and SegmentNumber is incremented. The process is then repeated at 442. If yes then IEI1=IEI1" AND x01 (last segment) and the SMS message is sent at 448. Once complete, the process resumes at 480.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising an attributes manager 18 could be created, maintained and/or deployed by a service provider that offers the functions described herein for customers. That is, a service provider could offer to deploy or provide the ability to update an address book as described above.

It is understood that in addition to being implemented as a system and method, the features may be provided as a program product stored on a computer-readable medium, which when executed, enables computer system 10 to provide an attributes manager 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A mobile communication device that automatically populates address book fields, the device comprising:
   a system for sending and receiving short message service (SMS) messages;
   an address book that includes an entry for an owner and entries for contacts associated with the owner, wherein each entry includes a set of attributes and at least one piece of attribute data;
   a system for parsing an incoming SMS message to identify a request for attribute data of the owner and for generating a responsive SMS message with attribute data of the owner;
   a system for determining whether any non-filled attributes exist in the entries in the address book for contacts associated with the owner without prompting from a user associated with the owner; and
   a system for:
      issuing SMS messages to contacts in the address book requesting additional attribute data to automatically complete the any non-filled attributes in response to determining the any non-filled attributes exist in the entries in the address book; and
      loading received attribute data associated with the any non-filled attributes into the address book.

2. The mobile communication device of claim 1, further comprising an access controller that authorizes access to attribute data of the owner based on at least one of a white list and a black list.

3. The mobile communication device of claim 2, further comprising a system for discarding SMS messages that request attribute data from an unauthorized requester.

4. The mobile communication device of claim 1, further comprising an attributes filter that filters the responsive SMS message based on an authorization model.

5. The mobile communication device of claim 1, further comprising a system for breaking up the responsive SMS messages into a set of smaller SMS messages.

6. The mobile communication device of claim 1, wherein the entry of the owner comprises a virtual card.

7. The mobile communication device of claim 1, wherein SMS messages for requesting and providing attribute data utilize an information element identification (IEI) field to determine if a received SMS message is a request for attribute data or contains attribute data.

8. A non-transitory computer readable medium having a computer program product stored thereon, which when executed by a computing device, automatically populates address book fields on a mobile device, comprising:
   program code for sending and receiving short message service (SMS) messages;
   program code for accessing an address book that includes an entry for an owner and entries for contacts associated with the owner, wherein each entry includes a set of attributes and at least one piece of attribute data;
   program code for parsing an incoming SMS message to identify a request for attribute data of the owner and for generating a responsive SMS message with attribute data of the owner;
   program code for determining whether any non-filled attributes exist in the entries in the address book for contacts associated with the owner without prompting from a user associated with the owner; and
   program code for:
      issuing SMS messages to contacts in the address book requesting additional attribute data to automatically complete the any non-filled attributes in response to determining the any non-filled attributes exist in the entries in the address book; and
      loading received attribute data associated with the any non-filled attributes into the address book.

9. The computer readable medium of claim 8, further comprising program code that authorizes access to attribute data of the owner based on at least one of a white list and a black list.

10. The computer readable medium of claim 9, further comprising program code for discarding SMS messages that request attribute data from an unauthorized requester.

11. The computer readable medium of claim 8, further comprising program code that filters the responsive SMS message based on an authorization model.

12. The computer readable medium of claim 8, further comprising program code for breaking up the responsive SMS messages into a set of smaller SMS messages.

13. The computer readable medium of claim 8, wherein the entry of the owner comprises a virtual card.

14. The computer readable medium of claim 8, wherein SMS messages for requesting and providing attribute data utilize an information element identification (IEI) field to determine if a received SMS message is a request for attribute data or contains attribute data.

15. A method for automatically populating address book fields on a mobile device, comprising:
  providing access to an infrastructure for sending and receiving short message service (SMS) messages;
  providing access to an address book that includes an entry for an owner and entries for contacts associated with the owner, wherein each entry includes a set of attributes and at least one piece of attribute data;
  determining whether any non-filled attributes exist in the entries in the address book for contacts associated with the owner without prompting from a user associated with the owner;
  issuing SMS messages to contacts in the address book requesting additional attribute data to automatically complete the any non-filled attributes in response to determining the any non-filled attributes exist in the entries in the address book; and
  loading received attribute data associated with the any non-filled attributes into the address book.

16. The method of claim 15, further comprising:
  parsing an incoming SMS message to identify a request for attribute data of the owner; and
  generating a responsive SMS message with attribute data of the owner.

17. The method of claim 15, further comprising:
  authorizing access to attribute data of the owner based on at least one of a white list and a black list; and
  discarding SMS messages that request attribute data from an unauthorized requester.

18. The method of claim 16, further comprising filtering the responsive SMS message based on an authorization model.

19. The method of claim 16, further comprising breaking up the responsive SMS messages into a set of smaller SMS messages.

20. The method of claim 15, wherein the entry of the owner comprises a virtual card.

21. The method of claim 16, wherein SMS messages for requesting and providing attribute data utilize an information element identification (IEI) field to determine if a received SMS message is a request for attribute data or contains attribute data.

22. A method for deploying a system for automatically populating address book fields on a mobile device, comprising:
  providing a computer infrastructure being operable to:
    send and receive short message service (SMS) messages;
    access an address book that includes an entry for an owner and entries for contacts associated with the owner,
    wherein each entry includes a set of attributes and at least one piece of attribute data;
    parse an incoming SMS message to identify a request for attribute data of the owner and for generating a responsive SMS message with attribute data of the owner;
    determine whether any non-filled attributes exist in the entries in the address book for contacts associated with the owner without prompting from a user associated with the owner; and
    issue SMS messages to contacts in the address book requesting additional attribute data to automatically complete the any non-filled attributes in response to determining the any non-filled attributes exist in the entries in the address book and;
    load received attribute data associated with the any non-filled attributes into the address book.

* * * * *